INVENTORS
HERBERT P. GROSSIMON
JAMES O. McDONOUGH
GERALD T. MOORE

Dennison, Jenney & Hildreth
ATTORNEYS

INVENTORS
HERBERT P. GROSSIMON
JAMES O. McDONOUGH
GERALD T. MOORE

Kenway, Jenney & Hildreth
ATTORNEYS

INVENTORS
HERBERT P. GROSSIMON
JAMES O. McDONOUGH
GERALD T. MOORE

Kinney, Jenney & Hildreth
ATTORNEYS

Dec. 29, 1970 H. P. GROSSIMON ET AL 3,551,808

PHASE COMPARATOR CIRCUIT

Filed Nov. 12, 1968 4 Sheets-Sheet 4

INVENTORS
HERBERT P. GROSSIMON
JAMES O. McDONOUGH
GERALD T. MOORE

Kenway, Jenney & Hildreth
ATTORNEYS

United States Patent Office 3,551,808
Patented Dec. 29, 1970

3,551,808

PHASE COMPARATOR CIRCUIT

Herbert P. Grossimon, Lexington, and James O. McDonough, Concord, Mass., and Gerald T. Moore, Glenview, Ill., assignors to Concord Control Inc., Boston, Mass., a corporation of Massachusetts Continuation-in-part of application Ser. No. 353,793, Mar. 20, 1964. This application Nov. 12, 1968, Ser. No. 774,692
Int. Cl. G01r 25/00
U.S. Cl. 324—83 2 Claims

ABSTRACT OF THE DISCLOSURE

This invention relates to apparatus for determining the relative phase of a pair of pulse trains. In a first embodiment, one pulse train is supplied to corresponding input terminals of a pair of AND gates and the gates are therefore open when the pulses have one value and closed when the pulses have a second value. The second pulse train is supplied directly to the other terminal of one AND gate and logically inverted to the other terminal of a second gate. The gates respond only to transitions in one direction. Thus a pulse appears on one or the other of the AND gate output terminals for each transition of the input pulse train depending upon whether the second pulse train is leading or lagging the reference pulse train. In a second embodiment of the phase comparator the information available is used to provide multiple output pulses for each transition of the input pulse train, the lead on which said pulses appear being dependent on the relative phase of the input pulse trains.

BACKGROUND AND BRIEF DESCRIPTION OF THE INVENTION

This application is a continuation-in-part of my copending U.S. patent application Ser. No. 353,793, filed Mar. 20, 1964, now Pat. 3,410,956.

The phase comparator of the present invention has particular utility with the planar encoder disclosed and claimed in the aforementioned patent and is described in conjunction with that apparatus by way of illustration.

In that apparatus an electro-optical transducer (e.g. a photocell) is mounted on a second floating arm in a plane parallel to the plane of motion of the stylus arm and adjacent to the optical grid. A light source is provided to supply illumination to the photocells though the optical grid. As the stylus is moved across the figure, the transducing element is correspondingly moved across the optical grid and electrical signals are generated by the photocells within the transducer as successive translucent and opaque segments of the grid are traversed. Effectively, the grid, light-source, and transducer form a light-modulation and detection system. The signals from the transducer are fed to a data interpreter unit to provide an output signal which represents the incremental change in position and direction of the stylus with respect to the chosen reference origin. The phase comparator of the present invention operates to provide signals indicating the sense or direction of the movement along each axis. The incremental changes in position of the stylus may be supplied to signal storage and recording apparatus for processing the signals for transfer to magnetic tape or other recording means. Alternatively the changes in position may be supplied directly to a computer for further processing. If desired, the output signals may also be fed to a digital counter which indicates the instantaneous position of the stylus in the form of a visual or other desired display.

For a fuller understanding of the nature and objects of our invention, reference should be had to the following detailed description taken in connection with the accompanying drawings in which.

Figure 6A:
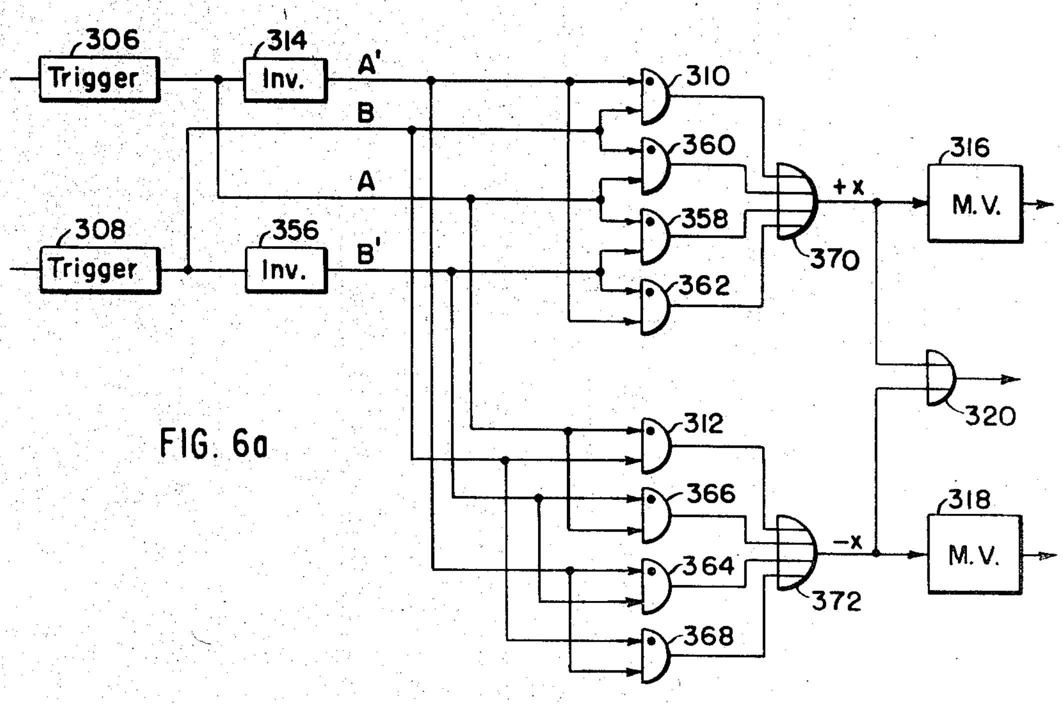
Figure 6B:
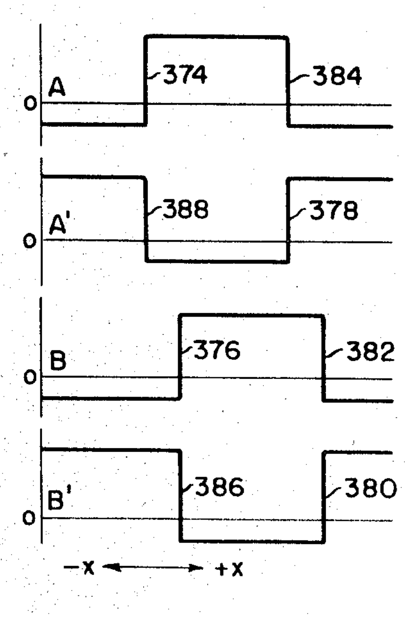

FIG. 6*a* is a block and line diagram of an alternative photocell interpretation circuit; and FIG. 6*b* is a waveform diagram useful in explaining the operation of the circuit of FIG. 6*a*.

Figure 1:
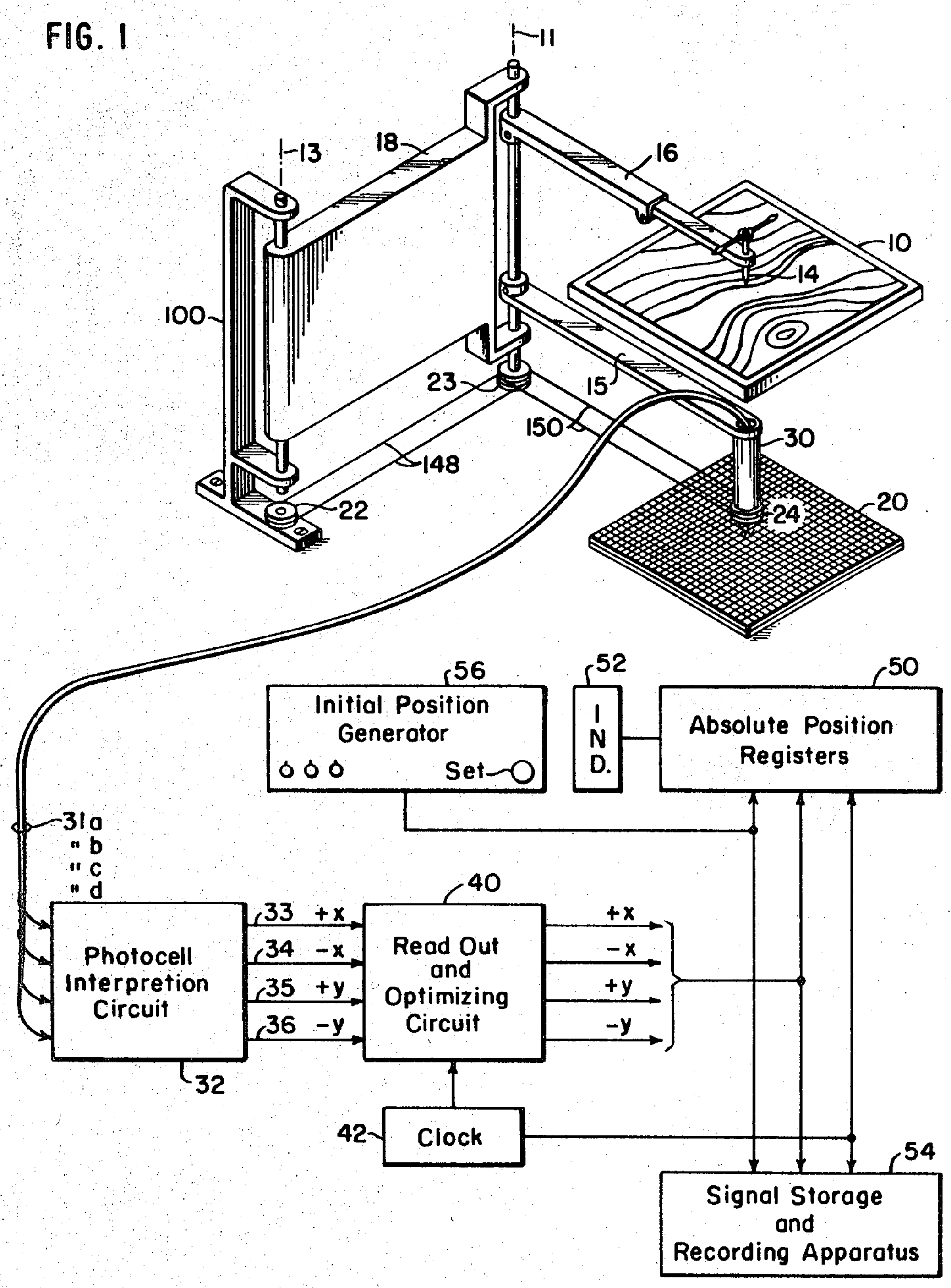
FIG. 1 is a pictorial and block and line diagram illustrating an embodiment of our invention.

In FIG. 1 one embodiment of a planar digital encoder according to our invention is shown. A map, chart, or other figure containing continuous curves ("curve" being used in its generic sense to include straight lines) to be digitized is mounted on a flat surface, such as a drawing board or the surface of a drafting table. A stylus or marking element 14 is attached to an arm 16; the arm 16 is in turn pivotally attached to an arm 18, the two arms forming a floating arm drafting machine. The arm 18 is free to rotate about the pivot point 13; thus the stylus 14 is capable of being moved in a horizontal plane over the entire surface of the table 10. Parallel to the table 10 and directly below it is an optical grid (or grating) 20. This optical grid consists of a first set of alternate translucent and opaque sectors running in a direction parallel to one axis of a given two axis coordinate system and a second set of alternate translucent and opaque sectors parallel to the second axis of the coordinate system. In FIG. 1 the coordinate system is shown as a rectangular coordinate system and the alternate translucent and opaque sectors of each set are parallel to the X and Y axes of the coordinate system respectively. It should be understood that other coordinate systems may also be used if desired.

An optical transducer 30, which is attached to an arm 15, is positioned directly above the grid 20. The arm 15 is also attached to the arm 18 at the pivot point 11 and is free to rotate about that point. The arms 15 and 16 are constrained to rotate about the pivot point 11 as a single unit. This may be accomplished by constructing the arms 15 and 16 as two separate but interconnected fingers of a single mechanical member pivoted about the point 11. Thus the motion of the stylus 14 with respect to the table 10 is reproduced exactly by the motion of the transducer 30 with respect to the grid 20. A conventional double pulley system such as is used on drafting machines and which includes pulleys 22, 23 and 24 maintains the angular orientation of the transducer 30 constant with respect to the X, Y axes of the grid 20 as the head 30 is moved about the table.

The transducer head 30 contains a light source and two sets of photocells for detection of motion in the X and Y direction across the grid 20. The bottom surface of the grid 20 is silvered to reflect the light issuing from transducer 30 back onto the photocells in the transducer. Alternatively, the drafting machine may be provided with an additional arm for supporting the light source below the grid. A more detailed description of the construction of transducer 30 is given below in conjunction with the explanation of FIGS. 3*a* and 3*b*. As the transducer 30 is moved over the grid 20, the light from the light source incident on the photocells is continually interrupted by the opaque segments of the grid 20. Thus the grid 20 serves as a modulation system for the light source and photocells in the transducer 30. The electrical signal thus generated by transducer 30 is fed to the photocell interpretation circuit 32. This circuit amplifies the signals appearing on the leads 31*a*, 31*b*, 31*c* and 31*d* from transducer 30 and converts these amplified signals into a series of pulses; these pulses appear on output leads 33 through 36 respectively. The presence of a pulse on any one of these leads signifies an incremental change in position of the transducer in the corresponding direction and the number of pulses on a given lead is proportional to the total distance traversed in that direction. The exact structure of the photocell interpretation circuit 32 is dependent on the type of photocell pickup used in the transducer 30. The structure of the unit will be discussed in greater detail in connection with the various pickup heads to be described below.

As stated above, the output signal on the leads 33 to 36 is representative of the incremental changes of position of the stylus. Before utilizing this output, however, it may be desirable to convert it into a different format for storage or further processing. Thus, for example, it may be desirable to synchronize the output on these leads with a series of clock pulses which control the overall timing of the system. The readout and optimizing circuit 40 accomplishes this purpose. The circuit 40 consists of a series of flip-flops and multivibrators under control of the clock circuit 42. The clock 42 may be any one of a number of known multivibrator or other type circuits designed to provide a series of accurately spaced pulses at predetermined times and bearing a fixed relation to each other. The clock controls the operation of the read-out and optimizing circuit 40 such that the output pulses from the circuit 40 are formed in synchronization with clock pulses from the clock circuit 42. Further the circuit 40 performs an optimizing operation on the data fed into it, that is, it determines whether each information bit may be combined with a following bit of information or must be read out by itself. For example, it may be desired to read out information from the circuit 40 only when one or both of the X and Y coordinates have changed. Thus, for example, if the stylus 14 were moved from the point 0, 0 along a path to $X=1$, $Y=0$, thence along the path $X=1$ to the final point $X=1$, $Y=1$ the circuit 40 would suppress the readout until the final point $X=1$, $Y=1$ had been reached. When our system is used with a high speed tape storage, this optimization of data will conserve valuable storage space on the tape.

The output from the circuit 40 is fed to the absolute position register 50 and also to the signal storage and recording apparatus 54. Both of these circuits are also under control of the clock 42. The function of the circuit 54 is to provide temporary storage for the data from circuit 40 and also to transfer this data onto any desired recording means. This circuit may be formed from any number of well known storage and recording circuits in common use with digital storage and recording systems.

The absolute position registers 50 consist of a set of bi-directional binary coded decimal counters, one counter being utilized for each of the coordinate axes involved. The purpose of these registers is to convert the incremental X, Y information into absolute form. The counters used in these registers may be any of a number of well-known bidirectional counters. Attached to the registers 50, and activated thereby, is an indicator 52. The function of this indicator is to provide a visual display of the absolute position of the stylus 14, as the stylus is moved to any point in the plane. A manual data input generator 56 is also connected to the absolute position register 50 and the signal storage and recording apparatus 54. The function of this generator is to allow the initial position of the stylus 14 to be recorded and displayed. The generator also contains provision for setting in any desired information associated with any selected position of the stylus 14.

The system described may be operated in either the incremental or the absolute mode. In the absolute mode the initial position or reference point of the stylus is entered by the manual data input generator 56 and the stylus is moved to any desired point in the plane defined by the table 10. The coordinates of the selected point with respect to the reference point are then automatically digitized and recorded or displayed. Any information associated with the selected point that the operator desires to preserve may also be entered via the manual data input generator 56. In the incremental mode, the relevant outlines of a contour, mechanical drawing, or other desired feature are traced by the operator by means of stylus 14. This information is again digitized and recorded or displayed.

Figure 2:
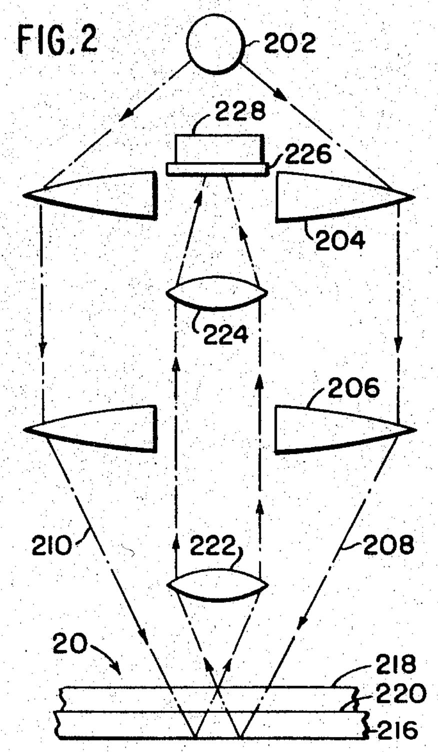
FIG. 2 is a diagrammatic illustration of the manner in which the light source and photocells may be mounted in the transducer.

FIG. 2 shows in diagrammatic form an optical system which is used in the transducer 30. As shown therein it includes a light source, such as an ordinary incandescent bulb 202, and a pair of lenses 204 and 206. These lenses are ring-shaped, the center portion being omitted for reasons to be hereinafter explained. As shown by the ray-lines 208 and 210 these lenses cause an area of the silvered surface 214 formed on the bottom of the grid plate structure to be illuminated. This light is reflected upwardly as seen in FIG. 2 through the two transparent plates 216 and 218. The grid is formed at the facing surfaces of the two plates 216 and 218, one set of opaque lines parallel to the X axis being formed on one plate e.g. plate 216 and a second set of lines parallel to the Y axis being formed on the other e.g. plate 218. The two plates are secured in facing relationship to form the grid, indicated at 220.

The light, after passing through the grid, next passes through the objective lens system formed by lenses 222 and 224 and is focused by this lens system on the photocell masking plate 226. Four photocells, shielded from all light except that falling on them from the mask, are enclosed within a housing shown at 228.

Figure 3:
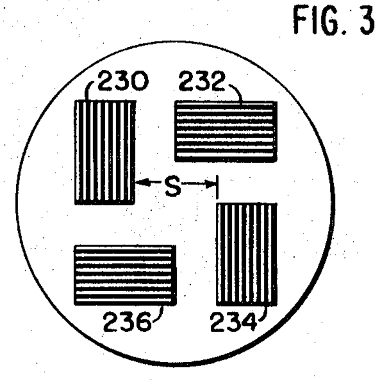
FIG. 3 is an end view showing the position of the photocells in the transducer.

FIG. 3 shows the photocell masking plate 226 in greater detail. As shown therein, the plate has four openings 230, 232, 234 and 236. A photocell is positioned behind each of the openings. The photocells behind the diagonally opposite openings 230 and 234 are for the detection of motion in the X direction and will be herein referred to as the X photocells. The photocells behind the openings 232 and 236, which are for the detection of motion in the Y direction will be referred to as the Y photocells. Each of the openings 230 and 234 is covered by a mask having alternate transparent and opaque sectors which correspond with the transparent and opaque sectors of the image of the X lines of the grating formed thereon. Thus, when the optical transducer is positioned so that the opaque lines in the mask correspond with the image of the opaque lines of the grid formed thereon by lenses 222 and 224, the maximum amount of light will strike the photocells, giving a maximum output signal. Conversely if the transducer is positioned so that the lines of the grid image fill the spaces in the mask over the photocell opening, then a minimum amount of light will be passed to the cell. Thus for movement in the X direction as the image of the grid lines alternately come into phase and then pass out of phase with the photocell lines a triangular waveform will be generated as shown for either the cell 230 or the cell 234 in FIG. 4.

Figure 4:
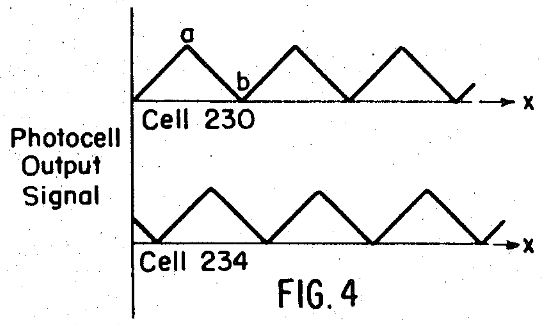
FIG. 4 shows idealized output waveforms of a pair of photocells used in the transducing element of FIG. 3.

To obtain directional information, the masks covering the photocells are so spaced that the corresponding point in the output waveform of one cell e.g. the cell behind opening 230 (hereinafter referred to as cell 230) will reach a peak one quarter unit of distance ahead (or behind) the other cell (e.g. cell 234). A "unit" is the distance from the corresponding edge of one opaque line of the grid to the next line measured at right angles to the line direction. Thus corresponding points on the masks for two cells are separated by a distance S such that $$S=nD\pm\frac{D}{4}$$

where D is the width of one unit in the X direction and $n$ is any integer. For movement in the positive X direction as shown in FIG. 4 the output of cell 230 "leads" that of cell 234 by one quarter of a unit. Obviously, for movement in the negative X direction, the output of cell 234 would "lead" the output of cell 230 by one quarter unit. This same spacing for the cells to measure movement in the X direction is also provided to measure movement in the Y direction so that the cells 232 and 236 provide otuput waveforms similar to those shown in FIG. 4 for movement in the Y direction.

Figure 5:
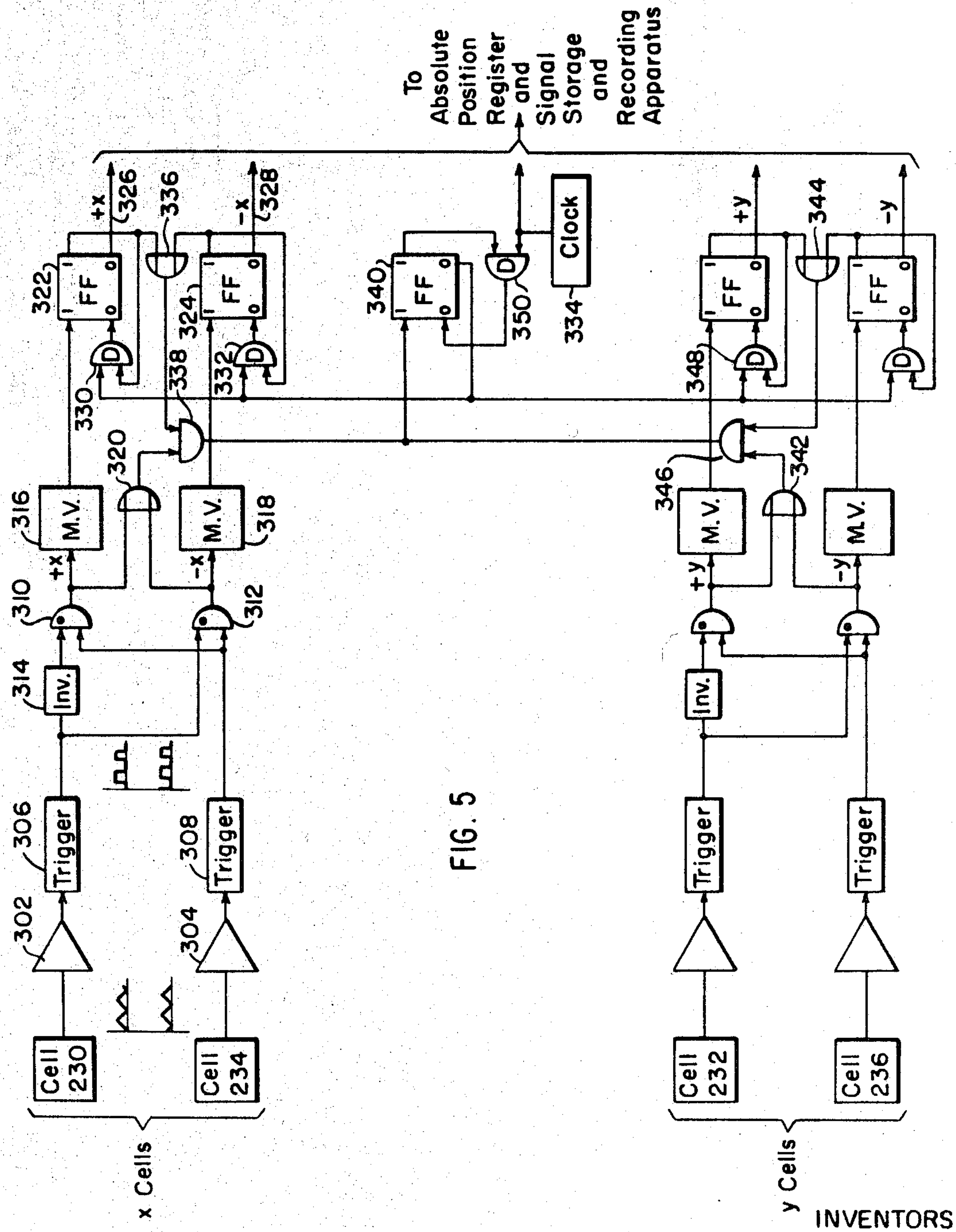
FIG. 5 is a block and line diagram of the photocell interpretation and optimizing circuitry.

In FIG. 5 we have illustrated the photocell interpretation circuit and an optimizing circuit of the type heretofore described. The photocell interpretation circuit for both the X and Y directions are identical. Accordingly only that for the X direction will be discussed in detail.

The signal from each of the X cells 230 and 234 is connected as an input signal to amplifiers 302 and 304. The amplified signal is supplied to a pair of trigger circuits 306 and 308 which provide a rectangular or square wave output. The output of trigegr circuit 308 is supplied to the two gate circuits 310 and 312. When the trigger circuit output is at its more positive level, gates 310 and 312 are open. When it is at its more negative level, the gates 310 and 312 are closed. The trigger circuits fire at some photocell output voltage level greater than the minimum to provide a positive output signal and "drop-out" or return to their initial state as the photocell output voltage decreases.

If, as described above, the output of cell 230 is "leading" that of cell 234 because of motion in the positive X direction, then during the time that the gates 310 and 312 are open because of a positive value of trigger 308, the transitions in the output signal from trigger 306 will be negative i.e. from a higher to a lower value. The gates 310 and 312 include a differentiating circuit to convert the transitions of the trigger circuit output waveforms to pulses; however the gates are designed to pass only positive pulses and the subsequent circuitry is responsive only to positive pulses. Thus even though the output signal from trigger 306 is connected to open gate 312, since all the transitions of the trigger output signal are negative, no signal will be passed by it.

A positive pulse will appear at the output of gate 310 for the condition specified since the output signal of trigger 306 is applied to an inverter 314 before being applied to gate 310 and the negative transitions become positive ones. Thus, for motion in the positive X direction a single positive pulse will appear at the output terminal of gate 310 for each line of the grid 20 crossed by the photocell.

For motion in the negative X direction the output from cell 234 will be leading that from the cell 230 and the transitions of the output of trigger 306 will all be in the positive direction during the time that gates 310 and 312 are open. These positive transitions will be inverted by inverter 314 and will thus not be passed by gate 310. However, they will be passed by gate 312. Thus, a positive pulse will appear on the output lead from gate 312 for each unit of motion in the —X direciton. The Y direction photocell interpretation circuit functions in an identical manner. In effect the trigger circuits 306 and 308, inverter 314 and gates 310 and 312 function as a phase detector providing a pulse output on one or the other of two leads for each "cycle" of the input signal, the lead on which the pulse appears depending on the relative phase of the two signals. If synchronization of the pulses with a clock pulse train and their optimization were not required the pulses could be sent directly to a counter or other circuit from the outputs of gates 310 and 312.

The remaining portion of the circuit of FIG. 5 performs these two functions i.e. synchronization and optimization. Synchronization insures that the pulses representing increments of motion are synchronized with a clock pulse train; the result of optimization is that if an X pulse of either type is thereafter followed by a Y pulse of either type (or the reverse), the first occurring pulse will be stored and the two pulses will be read out together.

Thus, in the circuit of FIG. 5 the pulses from the gates 310 and 312 are each applied to an individual multivibrator. The output of gate 310 supplies multivibrator 316 and gate 312 supplies multivibrator 318. Additionally the pulses are supplied to an OR gate 320 for purposes to be hereinafter explained.

The multivibrators 316 and 318 are of the "one shot" type and when triggered produce a change in state of their output signal (here assumed to be from a higher to a lower value). The output remains in this state for a period determined by the internal circuitry of the multivibrator and then returns to its initial value. The period of the multivibrators 316 and 318 is chosen to be slightly longer than the interval between clock pulses for reasons to be hereinafter explained.

As illustrated in FIG. 5, the output signal of multivibrator 316 is connected to the "1" input of flip-flop 322 and the output of multivibrator 318 is connected to the "1" input of flip-flop 324.

The transition occurring at the end of the period of the multivibrator 316 or 318 is of the proper polarity to cause the flip-flop 322 or 324 to change state to the "1" state. An output signal representing one increment of motion in the +X or —X direction results from a change of state of flip-flop 322 or 324 from the "1" to the "0" state, the flip-flops including a differentiation circuit and diode so polarized that only pulses corresponding to these transitions appear on the output leads 326 and 328 respectively.

When either the flip-flop 322 or 324 assumes the "1" state, it supplies a voltage level to the gate 330 or 332 to cause the gate to open. A pulse of appropriate polarity thereafter applied to this gate will be passed by it to the "0" input of the flip-flop, causing it to change state and to produce an output signal. Because the change in state from "1" to "0" will cause the gate to close, there is a delay provided in the gate (indicated by a "D") so that the pulse to cause change of state will be fully passed before the gate closes. Thus, an output pulse will appear when either flip-flop 322 or 324 is in the "1" state and the gates 330 or 332 are pulsed.

The X direction circuit also includes the OR gate 336 and the AND gate 338, the output of which feeds the "1" input of the flip-flop 340. Exactly similar circuitry is provided for the Y direction including an OR gate 342 corresponding to gate 320, a second OR gate 344 corresponding to gate 336 and an AND gate 346 corresponding to gate 338.

The flip-flop 340 is identical in its operation to the flip-flops 322 and 324 previously described. A delay gate 350 which functions in the same manner as gates 330 and 332 is associated with the flip-flop 340.

Clock pulses are supplied as input pulses to the gate 350 and the resetting of flip-flop 340 generates the read out pulse which is supplied to the gates 330 and 332, and to the corresponding gates in the Y direction circuit.

It is apparent from the foregoing that a clock pulse will generate a read out pulse only if flip-flop 340 has been set i.e. is in the "1" state; flip-flop 340 in turn will be set when any one of the X direction flip-flops has been set and a second X pulse, of either direction is passed through OR gate 320 and AND gate 338. Alternatively if there is a Y pulse stored in the output flip-flops and a second Y pulse appears, flip-flop 340 will be set so that the next clock pulse will generate a read out pulse. However, if an X pulse has been stored as a "1" in either of the output flip-flops 322 or 324 and immediately thereafter a Y pulse appears, it will not cause the flip-flop 340 to be set. Rather it will, after approximately one clock pulse period, be stored as a "1" in one of the Y output flip-flops. Thereafter the next pulse appearing from the photocell interpretation circuit, whether X or Y, will set flip-flop 340 and the next following clock pulse will generate a read out pulse, reading out the stored X and Y together. In this fashion a series of X pulses, or a series of Y pulses are read out one after the other. But an X pulse following by a Y (or a Y followed by an X) are read out together. This may represent a substantial saving in the amount of record required to store a given amount of information.

The output pulses and the clock pulses are supplied to the X and Y absolute position registers shown in FIG. 1 and to appropriate storage and recording apparatus as may be desired after being read out of the output flip-flops. As described above, the photocell interpretation circuit of our invention provides one pulse for each unit of motion in the X or Y direction, the pulse appearing on one or another lead depending upon whether the motion is in the positive or negative direction. It is also possible by adding certain elements to the photocell interpretation circuit to provide two or four pulses for each unit of motion; a circuit for providing four pulses per unit of motion is illustrated in FIG. 6*a*. Thus, if the optical grid has a line width of $\frac{5}{1000}''$ and a transparent area width of $\frac{5}{1000}''$, a pulse will be produced by the circuit of FIG. 5 for each $\frac{10}{1000}''$ of motion. In the circuit of FIG. 6*a*, a pulse will be produced for each $\frac{2.5}{1000}''$ of motion. This has the effect of providing a much finer grid, without encountering the problems posed in actually ruling a grid with such fine lines. Thus the circuit of FIG. 6*a* substantially improves the resolution of devices made according to our invention.

In FIG. 6*a* the output of the trigger circuits 306 and 308 are each supplied to an inverter, the signal from trigger 306 being supplied to inverter 314 as in FIG. 5 and the signal from trigger 308 being supplied to a new inverter 356. For ease of explanation cell 230 in FIG. 5 will be designated the A cell and cell 234 the B cell. Just as in the previous discussion, the output signal from cell 230, the A cell, leads the output of cell 234, the B cell, by ¼ unit or 90° for motion in the positive direction, and lags it by 90° for motion in the other direction.

The direct and inverted waveforms from each trigger are supplied to bus wires designated A, A′, B and B′. The direct waveform from the trigger associated with cell A is supplied to the bus identified as A and the inverted waveform to A′. Similarly the direct waveform from trigger 308 supplied by cell B is supplied to the bus identified as B and the inverted waveform to the bus labeled B′.

A waveform diagram showing the waveform and relative phase of these four signals is shown in FIG. 6*b*, each waveform being identified by the same reference as that of the bus on which it appears. Motion in the positive direction is motion to the right in FIG. 6*b* and motion to the left is motion in the negative X direction.

The signals appearing on the busses A, A′, B and B′ are connected to a series of gates which are identical to the gates 310 and 312 of FIG. 5. As discussed in connection with FIG. 5 each gate has two inputs, a "level" input and a "pulse" input, designated by a dot. If a positive voltage appears at the level input of a gate and a positive going transition appears at the pulse input, a positive pulse will appear on the output lead of the gate. The gates 310, 358, 360 and 362 all are connected to provide positive pulses for motion in the +X direction and their outputs are gated together by OR gate 370 and supplied to the multivibrator 316 and OR gate 320 just as in FIG. 5.

The gates 312, 364, 366 and 368 are connected to supply positive pulses for motion of the transducer in the −X direction and their outputs are gated together by OR gate 372 and supplied to multivibrator 318 and OR gate 320 just as in FIG. 5. The remaining circuit operation is identical to that of FIG. 5.

The connection for the various gates are made in the following manner. Assuming that motion starts at the left hand edge of the diagram of FIG. 6*b* and moves to the right, i.e. positive motion, the first positive transition which will produce a pulse is that occurring in the A waveform at 374. At this time the B′ waveform has a positive value. Hence a gate should be provided with the A waveform connected to the pulse input and the B′ waveform connected to the level input to provide an output pulse for this transition. The gate 358 in fact is so connected and provides the desired output pulse.

The next positive transition occurs in the B waveform at 376 and at this time the A waveform has a positive level. To provide an output pulse for this transition a gate should be provided with the B waveform connected to the pulse input and the A waveform connected to the level inputs. These are in fact the connections made to the gate 360. In an exactly similar fashion the transition 378 in the A′ waveform and 380 in the B′ waveform may be utilized to provide pulse outputs from the gates 310 and 362 respectively. The transition at 378 is the one used in the photocell interpretation of FIG. 5 to provide output pulses for motion in the positive X direction. The foregoing may be summarized in the following table:

+X DIRECTION

| Transitions in Fig. 6b | Gate in Fig. 6a | Pulse input | Level input |
|---|---|---|---|
| 374 | 358 | A | B′ |
| 376 | 360 | B | A |
| 378 | 310 | A′ | B |
| 380 | 362 | B′ | A′ |

It will be observed that half of the transitions in the four waveforms, the negative ones, were not used in the +X direction. However, for movement from right to left in FIG. 6*b*, the −X direction, these transitions become positive transitions and are available to provide positive output pulses for motion in the −X direction. The logic of connection is the same as for the positive direction and the following table summarizes the connections to the various gates to provide positive output pulses for motion in the −X direction.

−X DIRECTION

| Transitions in Fig. 6b | Gate in Fig. 6a | Pulse input | Level input |
|---|---|---|---|
| 382 | 368 | B | A′ |
| 384 | 312 | A | B |
| 386 | 366 | B′ | A |
| 388 | 364 | A′ | B′ |

It will be observed that transition 384 was the one used in FIG. 5 to provide positive pulses for motion in the −X direction. Thus, utilizing the circuit of FIG. 6*a*, we provide four pulses per unit of motion. It will of course be obvious that two of the positive X gates and two of the negative X gates may be omitted if desired to give two pulses per unit of motion.

Further, the four output pulses may be supplied to appropriate logic to provide error correction and alarm. Thus, if a pulse appears at the output of gate 360 corresponding to transition 376, the next pulse must appear either at gate 310 for motion in the positive direction or at gate 364 for motion in the negative direction. If it does not then the circuitry has failed to produce a pulse when it should have and an alarm may be indicated. Such a condition could exist if there were dirt on the grid for example. This type of circuit may be logically implemented if it is desired.

It will thus be seen that the objects set forth above, among those made apparent from the preceding description, are efficiently attained and, since certain changes may be made in the above construction without departing from the scope of our invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. A phase comparator for determining the relative phase of a pair of rectangular pulses comprising, in combination, a pair of input terminals and a pair of output terminals, inverting means connected to the respective input terminals for inverting the signals applied thereto, the logical inversion of the input signals appearing at the output terminals of the respective inverters, a plurality of AND gates having an output terminal and at least two input terminals, means connecting the first input terminal of each of a first pair of AND gates to the first comparator input signal, the second input terminals of said gates being connected to the second input signal and its logical inversion respectively, means connecting the first input terminal of each of a second pair of AND gates to the logical inversion of said first comparator input signal, the second input terminal of said second pair of AND gates being connected to the logical inversion of the second input signal and to the second input signal respectively, means connecting the first input terminal of each of a third pair of AND gates to the second comparator input signal, the second input terminals of said third pair of AND gates being connected to the logical inversion of the first comparator input signal and to the first input signal respectively, means connecting the first input terminal of each of a fourth pair of AND gates to the logical inversion of the second comparator input signal, the second input terminals of said fourth pair of AND gates being connected to the first comparator input signal and its logical inversion respectively, first and second OR gates, each having four input terminals and an output terminal, means connecting the output terminal of the first AND gate in each of said pairs of AND gates to a respective input terminal of said first OR gate, means connecting the output terminal of the second gate in each of said pairs of AND gates to the input terminal of said second OR gate, and means connecting the output signals of said OR gates to the respective output terminals of said comparator, whereby a multiple of pulses appear on one or the other of said output terminals on the reception of a pair of input signals at said input terminals, the output terminal on which said output signals appear being dependent on the relative phase of said input signals.

2. The combination defined in claim 1 wherein a first input terminal of each of said AND gates is responsive to signal levels of a single polarity only, and a second input terminal of each of said AND gates has connected thereto means for forming the derivative of the signals applied to said terminal.

References Cited

UNITED STATES PATENTS

| | | | |
|---|---|---|---|
| 2,980,858 | 4/1961 | Grondin et al. | 324—83DUX |
| 2,993,174 | 7/1961 | Lader et al. | 324—83AX |
| 3,297,947 | 1/1967 | Riordan et al. | 324—83 |

ALFRED E. SMITH, Primary Examiner

U.S. Cl. X.R.

328—133